United States Patent [19]

Silva et al.

[11] Patent Number: 4,753,790

[45] Date of Patent: Jun. 28, 1988

[54] SORBITOL COATED COMESTIBLE AND METHOD OF PREPARATION

[75] Inventors: Jose N. Silva, Astoria, N.Y.; Robert K. Yang, Randolph; Jose F. Zamudio-Tena, Morristown, both of N.J.

[73] Assignee: Warner-Lambert Company, Morris Plains, N.J.

[21] Appl. No.: 942,134

[22] Filed: Dec. 16, 1986

[51] Int. Cl.$^4$ .............................................. A23G 3/30
[52] U.S. Cl. ........................................ 424/440; 426/5; 426/103; 426/302; 426/303; 426/305; 424/48; 424/479; 424/480; 424/481; 424/482
[58] Field of Search ................................. 426/3-6, 426/103, 302, 303, 305; 424/16, 20, 31-38, 48

[56] References Cited

U.S. PATENT DOCUMENTS

| | | | |
|---|---|---|---|
| 1,267,320 | 5/1918 | Fries | 426/5 |
| 2,262,087 | 5/1940 | Bartlett et al. | 426/3 |
| 2,304,246 | 12/1942 | Ekert | 426/5 |
| 2,536,168 | 1/1951 | Goggin | 426/3 |
| 3,456,050 | 7/1969 | Rieckman et al. | 424/35 |
| 3,554,767 | 1/1971 | Daum et al. | 426/6 |
| 3,556,814 | 1/1971 | Whitman et al. | 426/302 |
| 3,635,735 | 1/1972 | Patil | 426/292 |
| 3,671,266 | 1/1972 | Cooper et al. | 426/303 |
| 3,737,322 | 6/1973 | Frey | 426/103 |
| 3,769,438 | 10/1973 | Rusch et al. | 426/103 |
| 4,105,801 | 8/1978 | Dogliotti | 426/103 |
| 4,127,645 | 11/1978 | Witzel | 424/16 |
| 4,127,677 | 11/1978 | Fronczkowski et al. | 426/5 |
| 4,146,653 | 3/1979 | Mader et al. | 426/3 |
| 4,238,510 | 12/1980 | Cherukuri et al. | 426/5 |
| 4,250,195 | 2/1981 | Cherukuri et al. | 426/5 |
| 4,317,838 | 3/1982 | Cherukuri et al. | 426/5 |
| 4,328,249 | 5/1982 | Mackay et al. | 426/3 |
| 4,423,086 | 12/1983 | Devos et al. | 426/3 |

FOREIGN PATENT DOCUMENTS

2115672  9/1983  United Kingdom ............... 426/5

OTHER PUBLICATIONS

U.S. Patent Application Ser. No. 905,732 filed 9/09/86, "Chewing Gum Mineral Supplement".
Abstract No. 77-91416Y/51.
Abstract No. 77-48163Y/27.
Chemical Abstract No. 95:12774e.
Chemical Abstract No. 102:12422b.
Chemical Abstract No. 72(5)20708b.
Food Science & Technology Abstracts 039642.
Food Science & Technology Abstracts 033878.
Chemical Abstracts vol. 53, No. 3540a.
Abstract 012550 70-01-L0003.

*Primary Examiner*—Jeanette Hunter
*Attorney, Agent, or Firm*—Henry C. Jeanette; Gary M. Nath

[57] ABSTRACT

A process for producing a sorbitol coated comestible is disclosed. The process comprises applying to a substantially anhydrous edible core at least two coating solutions comprising sorbitol to coat the edible core,
  wherein the first coating solution comprises:
    (a) about 77 to about 81 wt % sorbitol solution comprising about 65 to about 75 wt % sorbitol;
    (b) about 9.5 to about 12.5 wt % crystalline sorbitol powder;
    (c) about 0.25 to about 1.5 wt % of at least one film-forming agent; and
    (d) about 0.1 to about 5.0 wt % of at least one crystallization retardant; and
  wherein the second coating solution comprises:
    (a) about 82 to about 92 wt % sorbitol solution comprising about 65 to about 75 wt % sorbitol;
    (b) about 1.0 to about 2.5 wt % crystalline sorbitol powder;
    (c) about 0.05 to about 2.0 wt % of at least one film-forming agent; and
    (d) about 0.1 to about 0.3 wt % of at least one crystallization retardant; and
  after application of each coating solution, the solution is dried to prepare a final product which is a smooth, hard, and crunchy comestible.

22 Claims, No Drawings

SORBITOL COATED COMESTIBLE AND METHOD OF PREPARATION

FIELD

This invention relates to a process for producing a sorbitol coated comestible and to the sorbitol coated comestibles produced therefrom.

BACKGROUND

In the past, chewing gums in the form of shaped centers or cores, e.g. pellet gums, have been coated both with sugar and sugarless coatings to produce a candy-like, crunchy outer taste in the mouth with a chewable gum center portion. Conventionally, the core is a soft chewing gum portion, whereas the coating is crunchy or hard. In the case of sugarless coatings, aqueous solutions of xylitol, mannitol, maltitol and sorbitol, known as syrups, have been primarily employed. Such syrups may contain additives such as moisture absorbing compounds, anti-adherent compounds, dispersing agents, film-forming agents, binders and the like.

U.S. Pat. No. 4,127,677 to Fronczkowski et al., issued Nov. 28, 1978, discloses a xylitol-coated chewing gum. The coating is applied via a coating syrup containing from about 55% to 70% solids of which from about 95% to about 99.5% is xylitol. The solids also include about 0.5% to about 1.5% of colorant (e.g., titanium dioxide), and about 0.5% to about 1.5% binder and/or suspending agent (e.g., gum arabic).

U.S. Pat. No. 4,238,510 to Cherukuri et al., issued Dec. 9, 1980, discloses a sugarless coated comestible whose coating comprises a sweet material in crystalline form. The coating consisted essentially of sorbitol alone or in admixture, mannitol, and/or hydrogenated starch hydrolysate. The sorbitol is disclosed as being present in an amount within the range of from about 45% to about 90% by weight of the coating. Also disclosed is a method for applying the sugarless coating to centers. The method includes the steps of applying to the centers a first coating syrup which contains a sweetener such as sorbitol and/or other non-sugar sweetener, for example, mannitol or hydrogenated starch hydrolysate, an adhesion or binder component and a film-forming component, to thereby coat the centers with the first coating syrup, then a dusting mix is applied to the centers coated with the first coating syrup. The dusting mix includes one or more sweeteners, such as employed in the first coating syrup, in powdered form, and a moisture absorbing component, an anti-sticking component and a dispersing agent. It is disclosed that if desired, a second coating syrup may be applied to smooth out the coating of the centers and provide a shine thereto. The second coating generally includes ingredients similar to that present in the dusting mix but dispersed in water.

U.S. Pat. No. 4,317,838 to Cherukuri et al., issued Mar. 21, 1986, discloses a method for forming a sugarless coating on centers of chewing gum or other comestibles which includes the steps of applying to the centers a coating syrup which contains a sweetener such as sorbitol and/or other non-sugar sweetener, an adhesion or binder component such as gum arabic and a film forming component, an anti-adherent or filler component, and a dispersing agent to thereby coat the centers with the coating syrup. A dusting mix including one or more sweeteners, such as employed in the coating syrup, in powdered form, and a moisture aborbing component, an anti-adherent component and a dispersing agent are also employed.

The problems associated with forming a sorbitol coating on comestibles, e.g. chewing gum, have been many. These problems include chipping, flaking, and cracking of the coating upon the attainment of the desired coating thickness, mottling of the coating, poor texture (such as a rough surface), and lack of crunchiness upon the initial chewing of the comestible. Without wishing to be bound by theory, it is believed that some of these problems may be due to inflexibility of the coating in response to the geometric shape of the comestible being coated, a deficiency in the film-forming properties of the coating, and a lack of uniformity in the crystallization of the sweetener throughout the coating.

Therefore, a process for producing a sorbitol coated comestible, which coating has a good appearance, good texture, good flexibility relative to the shape of the comestible being coated, good film-forming properties, and good crunchiness, would be a welcome contribution to the art. Such a contribution is provided by this invention.

SUMMARY OF THE INVENTION

This invention provides a process for producing a sorbitol coated comestible whose coating has good appearance, good texture, good flexibility, good film-forming properties, and good crunchiness. That is, the coated comestible so prepared has a smooth, hard, and crunchy coating. The sorbitol coating is obtained by applying to the comestible at least two coating solutions, each solution comprising a saturated sorbitol solution, a crystalline sorbitol powder, one or more film-forming agents and one or more crystallization retardants, and then drying the coated comestible after each coating is applied. The criticality of the amounts of saturated sorbitol solution and crystalline sorbitol powder is such that amounts outside the required ranges, either above, or below, results in coatings deficient in one or more of the desired properties set forth heretofore. The coating solution can additionally contain binders, plasticizers and moisture absorbants, as well as other known in the art additives, such as, for example artificial sweeteners. Also provided are the sorbitol coated comestibles produced by the process of this invention.

Thus, this invention provides a process for producing a sorbitol coated comestible which comprises applying to a substantially anhydrous edible core at least two coating solutions comprising sorbitol to coat the edible core, wherein the first solution comprises:
 (a) about 77 to about 81 wt %, preferably about 79 to about 80 wt %, sorbitol solution comprising about 65 to about 75 wt %, preferably about 70 wt %, sorbitol;
 (b) about 9.5 to about 12.5 wt %, preferably about 10 to about 12 wt %, most preferably about 10.2 to about 11.8 wt %, crystalline sorbitol powder;
 (c) about 0.25 to about 1.5 wt %, preferably about 0.3 to about 1.5 wt % most preferably about 0.5 to about 1.0 wt % of at least one film-forming agent; and
 (d) about 1.3 to about 5.0 wt %, preferably about 1.5 to about 4.5 of at least one crystallization retardant; and wherein the second coating solution comprises:

(a) about 82 to about 92 wt %, preferably about 85 to about 88 wt %, sorbitol solution comprising about 65 to about 75 wt %, preferably about 70 wt %, sorbitol;

(b) about 1.0 to about 2.5 wt %, preferably about 1.5 to about 2.2 wt %, crystalline sorbitol powder;

(c) about 0.5 to about 2.0 wt %, preferably about 0.6 to about 2.0 wt %, most preferably about 0.6 to about 1.5 wt %, of at least one film-forming agent; and (d) about 0.1 to about 0.3 wt %, preferably 0.15 to about 0.25 wt %, of at least one crystallization retardant; and after application of each coating solution, the solution is dried to prepare a final product which is a smooth, hard, and crunchy comestible.

DETAILED DESCRIPTION OF THE INVENTION

The cores that are coated may be any substantially anhydrous edible or ingestible core capable of having a sorbitol coating applied to it. Such cores include chewing gums, candies, nuts such as almonds, chunks of licorice, jellies, bonbons cast in starch molds, pop-corn (preferably that obtained from corn dough because of a more regular form), tablets obtained by compression of various baked or agglomerated masses, pills or tablets for medicinal or therapeutic purposes, and the like. Preferably, chewing gum is utilized as the core whereby a sugarless coated chewing gum is prepared in a "CHICLETS" (trademark of Warner-Lambert Company) type format.

By substantially anhydrous it is meant that either: (a) the edible core has a relatively low moisture content which is available and capable of migrating through or from the edible core into any applied sorbitol coating; or (b) the moisture content that is present in the edible core is not readily available or not readily capable of migrating through or from the core into any applied sorbitol coating. Thus, for example, candy cores comprising nougat or nougat like material having a moisture content up to about 10 wt % may be utilized since the moisture available does not readily migrate into any applied sorbitol coating. When the core comprises a chewing gum, the chewing gum composition can have a moisture content up to about 5 wt % with up to about 3 wt % of water being preferred and up to about 2 wt % being most preferred and from about 0.5 to about 1.5 wt % being even more preferred.

The sorbitol solution used is a saturated solution of sorbitol. Those skilled in the art will appreciate that the concentration of the sorbitol in the saturated solution may vary in accordance with the temperature of the solution, but generally such saturated solution contains about 65 to about 75 wt % sorbitol with about 70 wt % being preferred. Sufficient saturated sorbitol solution is utilized in the coating solution such that when in combination with the crystalline sorbitol powder, and upon application of the coating solution to a coatable substrate, relatively uniform crystallization of the sorbitol occurs throughout the coating.

Similarly, sufficient crystalline sorbitol powder is utilized, relative to the amount of saturated sorbitol solution used, such that when the coating solution is applied to a coatable substrate, relatively uniform crystallization of the sorbitol throughout the coating occurs. Without wishing to be bound by theory, it is believed that the sorbitol crystalline powder acts as a seed for the saturated sorbitol solution. Therefore, sufficient crystalline sorbitol powder is needed to result in the crystallization of the sorbitol contained in the coating solution. An insufficient amount of such crystalline powder can result in poor crystallization and coatings that do not properly adhere to the substrate applied to. For example, in the application of multiple coatings, the coating being applied may dissolve the previous coating which was applied. This results in coatings having a poor or aesthetically undesirable appearance. Too much crystalline sorbitol powder can result in solutions which are too viscous. Such solutions would not distribute evenly and would not coat evenly on the cores to which it was applied. This would result in a sticky coating, a rough coating and/or a pitted coating.

At least one film-forming agent is utilized in the preparation of the coating solution. Representative film-forming agents include hydroxypropyl cellulose, methyl cellulose, (i.e., methyl ether of cellulose) ethyl cellulose, hydroxypropyl methyl cellulose, hydroxyethyl cellulose, carboxymethyl cellulose, gelatin, mixtures thereof, and the like. Preferably, a branched chained film-forming agent such as, hydroxypropyl cellulose, is utilized. Preferably, the hydroxypropyl cellulose has a Brookfield viscosity of not less than 145 cps for a 10% aqueous solution at 25° C.; and the hydroxypropyl methyl cellulose and the methyl cellulose have a Brookfield viscosity of about 12 to 18 cps for a 2% aqueous solution at 25° C. The coating solution can contain more than one film-forming agent and as such, for example, hydroxypropyl cellulose and methyl cellulose may be utilized. In such a combination the branched chained film-forming agent (e.g., hydroxypropyl cellulose) can be used in amounts of about 0.05 to about 1.5 wt % with about 0.01 to about 0.5 wt % being preferred, and the straight chained film-forming agent (e.g., methyl cellulose) can be used in amounts of about 0.5 to about 1.0 wt % with about 0.1 to about 0.5 wt % being preferred.

Without wishing to be bound by theory the crystallization retardant is believed to prevent premature crystallization of the sorbitol and therefore prevent, for example clumping or uneven coatings. Representative examples of such retardants include calcium carbonate, talc, magnesium trisilicate, titanium dioxide, and mixtures thereof. The preferred retardants are titanium dioxide and calcium carbonate. Most preferably a combination of calcium carbonate and titanium dioxide is utilized in amounts of about 0.2 to about 3.0 wt % calcium carbonate, preferably about 0.4 to about 2.0 wt %, and about 0.5 to about 1.0 wt % titanium dioxide, preferably about 0.25 to about 0.8 wt %.

Other components such as plasticizers, binders, artificial sweeteners, and moisture absorbants may be added to the coating solution.

Plasticizers suitable for use are water soluble. Examples include polyethylene glycol; polyvinylpyrrolidone; oligomers of polypropylene glycol (e.g., such as those having an average molecular weight of about 1000 to about 2000); polyvinyl alcohol; low molecular weight polyvinyl acetate (e.g., such as average molecular weights of about 800 to about 1200); water soluble natural gums, such as, alginates, xanthan gum, carrageenan, and agar agar; mixtures thereof; and the like. The plasticizer is optionally used in the first coating solution in amounts of about 0.2 to about 0.5 wt % with about 0.25 to about 0.35 wt % being preferred. The second coating solution can optionally contain the plasticizer in amounts from about 0.4 to about 1.0 wt % with about 0.4 to about 0.8 wt % being preferred. The preferred plasticizer is polyethylene glycol.

Binders suitable for use include gum arabic, xanthan gum, gum tragacanth, tapioca dextrin, modified food starch, zein, mixtures thereof, and the like. Gum arabic is the preferred binder. In the first coating solution the binder is generally used in amounts of about 0.05 to about 0.2 wt % with about 0.05 to about 0.15 wt % being preferred. In the second coating solution the binder is generally used in amounts of about 0.05 to about 0.3 wt % with about 0.1 to about 0.25 wt % being preferred.

Moisture absorbents, when used, can be mannitol, dicalcium phosphate, talc, magnesium stearate, calcium phosphate, calcium sulfate, silicas, and the like. Examples of silicas which may be useful include amorphous silicas, synthetic amorphous silicas, hydrous silica gels, synthetic silicas, sodium aluminum silicates, precipitated amorphous silicon dioxide of ultra fine particle size, and the like. Usually, the moisture absorbent is used in amounts of about 0.5 to about 3.0 wt % with about 0.5 to about 1.5 wt % being preferred in the first coating solution. Preferably mannitol is used as the moisture absorbent.

Artificial sweeteners such as the soluble saccharin salts, i.e., sodium or calcium saccharin salts, cyclamate salts, acesulfam-K, and the like, and the free acid form of saccharin may optionally be added to the coating solutions. Dipeptide sweeteners such as L-aspartyl-L-phenylalanine methyl ester and materials described in U.S. Pat. No. 3,492,131, and the like may also be used. These sweeteners may be used in amounts of about 0.005 to about 0.5 wt % based on the weight of the total coated comestible, and preferably about 0.05 to about 0.25 wt %. Usually the first coating solution can contain about 0.02 to about 0.06 wt %, based on the weight of the coating, preferably about 0.03 to about 0.06 wt % and most preferably 0.05 wt % of artificial sweetener. The second coating solution can usually contain about 0.05 wt % to about 0.2 wt %, based on the weight of the coating, with about 0.08 wt % to about 0.15 wt % being preferred of artificial sweetener.

In carrying out the process of the invention, the application of a coating solution can be repeated as many times as necessary to build up a desired coating weight and thickness on the edible cores. For example, about a 15% to about a 30% shell coating may be obtained from about 18 to about 40 applications of the first coating solution. The second coating solution may then be applied until the desired amount or thickness is added to the first shell coating. For example, an additional shell coating of about 5% to about 15% may be added in about 10 to 15 coating solution applications of the second coating solution. Similarly, the third coating solution may be applied in one or more applications until the desired amount or thickness is obtained.

The coating solution may be applied utilizing known techniques, such as Pan Coating. For example, in a pan coating method the comestible e.g., chewing gum cores, are placed in a revolving coating pan and dedusted using cool dry air. The coating solution is added to the revolving pan in portions until the desired amount or thickness of coating is deposited on the comestible. Before each subsequent portion of coating solution is applied, the prior coating is allowed to dry by gently flowing warm air (about 80° F. to about 95° F. at about 250 CFM to about 500 CFM) over the comestible. Generally, the coating dries in from about 3 to about 6 minutes. At any desired point in the sequence of coating applications flavoring agents may be added if desired. Usually the flavoring agents are added as a separately applied coating to the shell being produced. Preferably, upon attainment of the desired coating amount or thickness, a coating comprising a binder may be applied to the sorbitol coated comestible thereby resulting in a binder coating on the sorbitol coated comestible. After all the coating solutions are applied the coated comestible may then be placed in a polishing pan for the addition of the sealing coating hereinafter described.

The binder coating is applied using a coating solution comprising at least one binder heretofore described. The solution can contain about 20 to about 30 wt % binder with about 25 wt % being preferred. Conveniently, the binder used in the binder coating solution and the coating solutions comprising sorbitol, when such binder is used therein, is the same.

Flavoring Agents (flavorings) may be added to the coating. Suitable flavoring agents include those described hereinafter for use in the chewing gum compositions. When applied in the coating the flavoring agent is usually used in amounts of about 0.05 to about 0.10 wt % with about 0.06 to about 0.09 wt % being preferred, and about 0.07 to about 0.09 wt % being most preferred.

After the final application of coating solution, and after such applied coating has dried, a sealing coating is preferably applied to the coated comestible. The sealing coating seals out moisture and aids in giving the coated comestible a polished appearance. The sealing coating comprises a sealant such as, for example a blend of natural and artificial food grade waxes (such as a blend of beeswax, microcrystalline wax, paraffin wax, and the like), candelilla wax, paraffin wax, shellac, and the like. Usually, the sealing coating comprises about 0.01 to about 0.6 wt % of the total coating with about 0.05 to about 0.2 wt % being preferred.

When the edible core is chewing gum, the chewing gum composition may be formulated from standard ingredients and by known methods in the art. The composition is comprised of a gum base and such additional additives which would ordinarily be included to comprise a sugarless chewing gum composition, i.e., sweeteners comprising natural or synthetic sugar substitutes, flavor, fillers and the like; or, where utilized, to comprise a sugar containing chewing gum composition, i.e., corn syrup, sugar, flavor, fillers and the like.

Suitable chewing gum compositions are described in U.S. Pat. No. 4,514,422 to Yang et al., issued Apr. 30, 1985; U.S. Pat. No. 4,579,738 to Cherukuri et al., issued Apr. 1, 1986; U.S. Pat. No. 4,581,234 to Cherukuri et al., issued Apr. 8, 1986; and U.S. Pat. No. 4,587,125 to Cherukuri et al., issued May 6, 1986 the disclosures of each being incorporated herein by reference thereto.

The amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base used in this invention may be any water-insoluble gum base well known in the art. Illustrative examples of suitable polymers in gum bases include both natural and synthetic elastomers and rubbers. For example, those polymers which are suitable in gum bases include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene, polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood rosin, penataerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The elastomer solvent may be employed in an amount ranging from about 10% to about 75% and preferably about 45% to about 70% by weight of the gum base.

A variety of traditional ingredients used as plasticizers or softeners such as lanolin, stearic acid, sodium stearate, potassium stearate, glyceryl triacetate, glycerin, lecithin, and glyceryl monostearate and the like, may also be incorporated into the gum base to obtain a variety of desirable textures and consistency properties. These additional materials are generally employed in amounts of up to about 30% by weight and preferably in amounts of from about 3% to about 5% by weight of the final gum base composition.

The chewing gum composition employing the instant gum bases generally contain sweetening agents. The sweetening agent may be selected from a wide range of materials including water-soluble agents, water-soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch or corn syrup solids and sugar alcohols such as sorbitol, xylitol mannitol, hydrogenated starch hydrolysate and mixtures thereof;

B. Water-soluble artificial sweeteners such as the soluble saccharin salts, i.e., sodium or calcium saccharin salts, cyclamate salts, acesulfam-K and the like, and the free acid form of saccharin; and C. Dipeptide based sweeteners such as L-aspartyl-L-phenylalanine methyl ester and materials described in U.S. Pat. No. 3,492,131 and the like.

In general, the amount of sweetener will vary with the desired amount of sweetener selected for a particular chewing gum composition. This amount will normally be 0.01% to about 90% by weight when using an easily extractable sweetener. The water-soluble sweeteners described in category A above, are preferably used in amounts of about 25% to about 75% by weight, and most preferably from about 50% to about 65% by weight of the final chewing gum composition. In contrast, the artificial sweeteners described in categories B and C are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

The chewing gum composition of this invention may additionally include the conventional additives of coloring agents such as titanium dioxide; emulsifiers such as lecithin and glyceryl monostearate; and fillers such as aluminum hydroxide, alumina, aluminum silicates, talc, dicalcium phosphate, calcium carbonate, and combinations thereof. Preferably the amount of fillers used is about up to 25% by weight of the gum base.

Natural and synthetic flavoring agents well known to the chewing gum art may be added to the chewing gum compositions of the instant invention. These flavoring agents may be chosen from synthetic flavor oils and flavoring aromatics, and/or oils, oleo resins and extracts derived from plants, leaves, flowers, fruits and so forth, and combinations thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds, and cassia oil. Also useful are artificial, natural or synthetic fruit flavors, such as vanilla, and citrus oil, including lemon, orange, grape, lime and grapefruit and fruit essences including apple, pear, peach, strawberry, raspberry, cherry, plum, pineapple, apricot and so forth.

The amount of flavoring agent employed in the chewing gum shell is normally a matter of preference subject to such factors as flavor type, gum base type and strength desired. In general, amounts of about 0.5% to about 3.0% by weight of the final chewing gum composition are useable with amounts of about 0.3% to about 1.5% being preferred and about 0.7% to about 1.2% being most preferred.

The colorants that may be used include pigments such as titanium dioxide and may be incorporated in amounts of up to 1% or higher by weight. Also, the colorants may include other dyes suitable for food, drug and cosmetic applications, and known as F.D. & C. dyes and lakes.

The following examples are illustrative only and should not be construed as limiting the invention in any way. Those skilled in the art will appreciate that variations are possible which are within the spirit and scope of the appended claims.

In the examples that follow: (1) the saturated sorbitol solution (liquid) contained about 70% solid sorbitol and 30% liquid, and was obtained form Roquette Corporation under the product designation Roquette 70/02 Liquid; (2) the crystalline sorbitol powder was in the beta form and was obtained form Pfizer Inc.; (3) the methyl cellulose had a Brookfield viscosity of about 12 to about 18 cps for a 2% aqueous solution at 25° C.; (4) the hydroxypropyl cellulose had a Brookfield viscosity of not less than 145 CPS for a 10% aqueous solution at 25° C.; and (5) the hydroxypropyl methyl cellulose had a Brookfield viscosity of about 12 to about 18 cps for a 2% aqueous solution at 25° C.

Also, in the examples that follow the chewing gum composition, used as the cores, had a moisture content of about 1.5 wt % based on the weight of the chewing gum composition.

Additionally, in the examples that follow, unless indicated otherwise, a coating layer applied is dried before a subsequent layer is applied.

All percentages recited throughout the specification are based on the weight of solution used unless indicated otherwise.

Unless indicated otherwise, in the Examples that follow the procedures and formulations used were as in Example I.

EXAMPLE I

In this example, representative of the invention, the sorbitol coated chewing gum cores of Table 5 were prepared in a "CHICLETS" (Trademark of Warner-Lambert Company) type format.

Solutions A-D, used in making the coated cores are set forth in Tables 1-4, respectively. The solutions were prepared using a G/W Homo-mixer (mixer).

In the preparation of the solutions, the order of mixing the ingredients is not critical. However, as those skilled in the art can appreciate, the celluloses which are solids are difficult to dissolve. Therefore, solutions containing them are conveniently made by first dissolving the cellulose in the ingredient having the most amount of water. The celluloses are dissolved using high shear (vigorous mixing) generally before any other solid is dissolved in the solution. This method of mixing is usually used to avoid clumping of the cellulose. In general when Solution D (comprising celluloses) is mixed with another solution it is vigorously mixed until a homogeneous mixture is obtained.

The coatings obtained, when chewed, were smooth, hard and crunchy.

TABLE 1

| No. | Ingredients | Percent (w/w) |
|---|---|---|
| | Solution A | |
| 1 | Saturated Sorbitol Liquid | 79.10 |
| 2 | Crystalline Sorbitol Powder | 10.25 |
| 3 | Mannitol | 1.00 |
| 4 | Methyl Cellulose | 0.30 |
| 5 | Calcium Carbonate Precipitated USP | 2.85 |
| 6 | Titanium Dioxide | 1.50 |
| 7 | Solution D | 5.00 |

TABLE 2

| No. | Ingredients | Percent (w/w) |
|---|---|---|
| | Solution B | |
| 1 | Saturated Sorbitol Solution | 87.16 |
| 2 | Crystalline Sorbitol Powder | 2.14 |
| 3 | Solution D | 10.70 |

TABLE 3

| No | Ingredients | Percent (w/w) |
|---|---|---|
| | Solution C | |
| 1 | Gum Arabic | 25.0 |
| 2 | Potable Water | 75.0 |

TABLE 4

| No. | Ingredients | Percent (w/w) |
|---|---|---|
| | Solution D | |
| 1 | Hydroxypropyl Cellulose | 6.00 |
| 2 | Methyl Cellulose | 6.00 |
| 3 | Polyethylene Glycol | 6.00 |
| 4 | Gum Arabic | 2.00 |
| 5 | Calcium Carbonate Precipitated USP | 2.00 |
| 6 | Water Potable | 78.00 |

TABLE 5

| No. | Ingredients | Percent (w/w) |
|---|---|---|
| | Sorbitol Coated Chewing Gum | |
| 1 | Chewing Gum Cores | 66.612 |
| 2 | Solution A | 17.588 |
| 3 | Solution B | 15.584 |
| 4 | Solution C | 0.128 |
| 5 | Peppermint flavor Oil | 0.044 |
| 6 | Wax | 0.044 |

Solution A, Table 1, was prepared by mixing the Ingredients in the order of No. 1, 4 and 3, 5 and 6, slow addition of 2, and slow addition of 7 with vigorous mixing for 4 minutes. When the solution was completely homogeneous it was removed from the Homomixer and heated and maintained at about 50° C.–60° C. with agitation during use. Solution A was applied, at about 50° C.–60° C., preferably 50° C.–55° C.

Solution B, Table 2, was prepared by mixing the ingredients in the order of No. 3, 1 (slow addition) and then 2.

Solution C, Table 3, was prepared by mixing the ingredients which are removed from the mixer and heated to 70° C. after the gum arabic was completely dissolved. The solution was then used at room temperature (24° C.).

Solution D, Table 4, was prepared by mixing the ingredients in the order of No. 6 (at 70° C. to 80° C.), 3, 1, 2, and 4 and 5. Solution D was used at room temperature (24° C.).

The sorbitol coated chewing gum of Table 5 was prepared by placing the chewing gum cores, in the cooper pan. The pan was rotated until all of the sheets were broken into individual cores, i.e., all the cores were separated.

Solution A (Table 1), was then applied to the cores in small portions with intermittent drying at about 85° F. to about 92° F. until the coated cores had about a 20% total shell coating. At about a 9% and 19% total shell coating, 1 g of peppermint flavor oil was applied.

Solution B (Table 2), was applied next in small portions again with intermittent drying until the total shell coating on the core was about 31%. At a total shell coating of about 21.6%, 1 g of peppermint flavor oil was applied.

Solution C (Table 3), was applied in small portions again with intermittent drying until the coated cores contained about a 31.4% total shell coating.

When the coated cores were dry they were placed in a polishing pan and wax coated. The polishing time was about 15 to 25 minutes.

EXAMPLE II

In this example, representative of the invention, the sorbitol coated chewing gum cores of Table 9 were prepared. Solutions A, D and E used in making the coated cores are set forth in Tables 7 to 9, respectively. Solution B was prepared as in Example I, except for the use of Solution D of Table 7, and Solution C was prepared as in Example I.

When chewed it was found that the coating produced on the chewing gum cores was smooth, hard and crunchy.

TABLE 6

| No. | Ingredients | Percent (w/w) |
|---|---|---|
| | SOLUTION A | |
| 1 | Saturated Sorbitol Liquid | 79.10 |

TABLE 6-continued

SOLUTION A

| No. | Ingredients | Percent (w/w) |
|---|---|---|
| 2 | Crystalline Sorbitol Powder | 10.25 |
| 3 | Hydroxypropyl Methyl Cellulose | 0.30 |
| 4 | Propylene Glycol USP | 1.00 |
| 5 | Calcium Carbonate Precipitated USP | 2.85 |
| 6 | Titanium Dioxide USP | 1.50 |
| 8 | Solution D | 5.00 |

TABLE 7

Solution D

| No. | Ingredients | Percent (w/w) |
|---|---|---|
| 1 | Hydroxypropyl Cellulose | 6.0 |
| 2 | Hydroxypropyl Methyl Cellulose | 6.0 |
| 3 | Polyethylene Glycol | 6.0 |
| 4 | Calcium Carbonate Precipitated USP | 2.0 |
| 5 | Water, Potable | 80.0 |

TABLE 8

Solution E

| No. | Ingredients | Percent (w/w) |
|---|---|---|
| 1 | Oil of Peppermint | 88.9 |
| 2 | Menthol Crystal | 11.1 |

TABLE 9

Sorbitol Coated Chewing Gum

| No. | Ingredients | Percent (w/w) |
|---|---|---|
| 1 | Chewing Gum Cores | 69.27 |
| 2 | Solution A | 15.67 |
| 3 | Solution B | 14.81 |
| 4 | Solution C | 0.11 |
| 5 | Solution E | 0.09 |
| 6 | Wax | 0.05 |

The coated chewing gum, Table 9, was prepared as follows:

(A) Solution A was applied until the coated cores contained a 19.7% total shell coating. At about a 3% and a 10% total coating, about 1.25 g and about 3 g of Solution E, respectively, was applied.

(B) Solution B was then applied until about a 29% total shell coating was obtained. At about a 25% total shell coating, 1.5 g of Solution E was applied.

(C) Solution C was applied until the coated cores contained a 29.6% total shell coating.

EXAMPLE III

In this example, representative of the invention, the sorbitol coated chewing gum cores of Table 13 were prepared. Solutions A, B and D used in making the coated cores are presented in Tables 10-12, respectively. Solution C was prepared as in Example I.

When chewed it was found that the coatings obtained were smooth, hard, and crunchy.

TABLE 10

Solution A

| No. | Ingredients | Percent (w/w) |
|---|---|---|
| 1 | Saturated Sorbitol Liquid | 79.10 |
| 2 | Crystalline Sorbitol Powder | 11.25 |
| 3 | Methyl Cellulose | 0.30 |
| 4 | Calcium Carbonate Precipitated USP | 2.85 |
| 5 | Titatnium Dioxide | 1.50 |
| 6 | Solution D | 5.00 |

TABLE 11

Solution B

| No. | Ingredients | Percent (w/w) |
|---|---|---|
| 1 | Saturated Sorbitol Liquid | 81.69 |
| 2 | Crystalline Sorbitol Powder | 2.01 |
| 3 | Solution D | 16.30 |

TABLE 12

Solution D

| No. | Ingredients | Percent (w/w) |
|---|---|---|
| 1 | Hydroxypropyl Cellulose | 6.00 |
| 2 | Methyl Cellulose | 6.50 |
| 3 | Polyethylene Glycol | 6.25 |
| 4 | Calcium Carbonate Precipitated USP | 6.25 |
| 5 | Water, Potable | 75.00 |

TABLE 13

Sorbitol Coated Chewing Gum

| No. | Ingredients | Percent (w/w) |
|---|---|---|
| 1 | Chewing Gum Cores | 66.61 |
| 2 | Solution A | 15.18 |
| 3 | Solution B | 17.84 |
| 4 | Solution C | 0.26 |
| 5 | Peppermint flavor oil | 0.07 |
| 6 | Wax | 0.04 |

The sorbitol coated chewing gum, Table 13, was prepared as follows:

(A) Solution A was applied until the coated cores contained 16.9% total shell coating. At about an 8% and a 15% total shell coating 2 g and 1.5 g of oil of peppermint was applied, respectively.

(B) About 0.64% of the amount of solution C to be applied was applied.

(C) Solution B was then applied until the coated cores contained a 29.9% total shell coating. At about a 22% total shell coating 1.5 g of peppermint flavor oil was applied.

(D) Then the remaining amount of Solution C was applied until the coated cores contained a 30% total shell coating.

EXAMPLE IV

In this example, representative of the invention, the sorbitol coated chewing gum cores of Table 17 were prepared. Solutions A, B and D used in making the coated cores are presented in Tables 14-16, respectively. Solution C was prepared as in Example I.

The coatings obtained were smooth, hard and crunchy when subjected to an expert chewing panel.

TABLE 14

Solution A

| No. | Ingredients | Percent (w/w) |
|---|---|---|
| 1 | Saturated Sorbitol Liquid | 79.10 |
| 2 | Crystalline Sorbitol Powder | 11.75 |
| 3 | Methyl Cellulose | 0.30 |
| 4 | Calcium Carbonate Precipitated USP | 2.85 |
| 5 | Titanium Dioxide | 1.00 |
| 6 | Solution D | 5.00 |

TABLE 15

Solution B

| No. | Ingredients | Percent (w/w) |
|---|---|---|
| 1 | Sorbitol Solution* | 88.0 |

TABLE 15-continued

| Solution B | | |
|---|---|---|
| No. | Ingredients | Percent (w/w) |
| 2 | Solution D | 12.00 |

*Sorbitol Solution
Saturated Sorbitol Liquid 97.60
Crystalline Sorbitol Powder 2.40

TABLE 16

| Solution D | | |
|---|---|---|
| No. | Ingredients | Percent (w/w) |
| 1 | Hydroxypropyl Cellulose | 5.00 |
| 2 | Methyl Cellulose | 5.00 |
| 3 | Calcium Carbonate Precipitated USP | 10.00 |
| 4 | Saccharin Sodium Spray Dry | 1.50 |
| 5 | Titanium Dioxide | 1.00 |
| 6 | Deionized Water | 77.50 |

TABLE 17

| Sorbitol Coated Chewing Gum | | |
|---|---|---|
| No. | Ingredients | Percent (w/w) |
| 1 | Chewing Gum Cores | 58.872 |
| 2 | Solution A | 28.188 |
| 3 | Solution B | 12.641 |
| 4 | Solution C | 0.195 |
| 5 | Peppermint Oil Flavor | 0.065 |
| 6 | Menthol Flavor Blend | 0.013 |
| 7 | Candelilla Wax Powder | 0.026 |

Solution A, Table 14, was prepared by mixing the ingredients in the order of No. 1 (about 50° C. to about 55° C.), 2, 3, 4, and 5, 6 (slowly, vigorous mixing for about 10 minutes).

Solution B was applied at about 30° C. to about 40° C.

Solution D, Table 16 was prepared by mixing the ingredients in the order of No. 6 (about 50° C.-53° C.), 1, 2, 3, 4 and 5.

The sorbitol coated chewing gum, Table 17, was prepared as follows:

(A) Solution A was applied, until the coated cores contained a 29.64% total shell coating. At about a 8% or a 10%, and a 19% total shell coating 1.5 g and 3.5 g of the peppermint flavor oil were applied, respectively.

(B) Solution B was then applied until the coated cores, contained a 37.16% total shell coating. At about a total shell coating of 33% 1.0 g of the menthol flavor blend was applied.

(C) Next Solution C was applied until the coated cores contained a 37.20% total shell coating.

(D) The coated cores were then polished using candelilla wax which was sprinkled onto the coated cores in a rotating pan which was run for 10 minutes

EXAMPLE V

In this example, representative of the invention, the sorbitol coated round nougat cores of Table 18 were prepared. Solutions A and B were prepared as in Example IV. Solution C was prepared as in Example I. Solution D was prepared as in Example IV, except 6.50 wt % methyl cellulose was used and no saccharin was used.

When chewed, the coating obtained was smooth, hard and crunchy.

TABLE 18

| SORBITOL COATED NOUGAT | | |
|---|---|---|
| No. | Ingredients | Percent (w/w) |
| 1 | Nougat Cores | 64.92 |
| 2 | Solution A | 16.06 |
| 3 | Solution B | 18.59 |
| 4 | Solution C | 0.14 |
| 5 | Peppermint Flavor Oil | 0.07 |
| 6 | Candelilla Wax Powder | 0.22 |

The sorbitol coated nougats, Table 18, were prepared as follows:

(A) Solution A was applied to the individual cores in small portions until the coated cores had about a 20% total shell coating. At about a 9% and 19% total shell coating 1 g of peppermint flavor oil was applied.

(B) Solution B was then applied until about a 31% total shell coating was obtained. At a total shell coating of about 21.6% 1 g of peppermint flavor oil was applied.

(C) Solution C was then applied until about a 31.4% total shell coating was obtained.

(D) The coated cores were then polished using candelilla wax which was sprinkled onto the coated cores in a rotating pan which was run for 10 minutes.

The invention being thus described, it will be obvious that the same may be varied in many ways. Such variations are not to be regarded as a departure from the spirit and scope of the invention and all such modifications are intended to be included within the scope of the claims.

What is claimed is:

1. A process for producing a sorbitol coated comestible which comprises applying to a substantially anhydrous edible core at least two coating solutions comprising sorbitol to coat the edible core, wherein the first coating solution comprises:
 (a) about 77 to about 81 wt % sorbitol solution comprising about 65 to about 75 wt % sorbitol;
 (b) about 9.5 to about 12.5 wt % crystalline sorbitol powder;
 (c) about 0.25 to about 1.5 wt % of at least one film-forming agent; and '(d) about 0.1 to about 5.0 wt % of at least one crystallization retardant; and wherein the second coating solution comprises:
 (a) about 82 to about 92 wt % sorbitol solution comprising about 65 to about 75 wt % sorbitol;
 (b) about 1.0 to about 2.5 wt % crystalline sorbitol powder;
 (c) about 0.05 to about 2.0 wt % of at least one film-forming agent; and
 (d) about 0.1 to about 0.3 wt % of at least one crystallization retardant; and after application of each coating solution, drying said solution to prepare a final product which is a smooth, hard, and crunchy comestible.

2. The process of claim 1 wherein an additional step is added in which a coating solution comprising a binder is applied to said coated comestible after the sorbitol coating has been applied.

3. The process of claim 1 wherein an additional step is added in which a sealing coating is applied to said coated comestible after the sorbitol coating has been applied.

4. The process of claim 1 wherein an additional step is added in which the application of each of said first and second solutions is repeated.

5. The process of claim 1 wherein said first solution additionally contains a plasticizer, a binder, and, optionally a moisture absorbent; and said second solution additionally contains a plasticizer and a binder.

6. The process of claim 1 wherein said film-forming agent of said first and second coating solution is independently selected from the group consisting of hydroxypropyl cellulose, hydroxypropyl methyl cellulose, methyl cellulose, ethyl cellulose, hydroxyethyl cellulose, gelatin, and mixtures thereof; and said crystallization retardant of said first and second coating solution is independently selected from the group consisting of calcium carbonate, talc, magnesium trisilicate, titanium dioxide, and mixtures thereof.

7. The process of claim 5 wherein said plasticizer for said first and second solution is selected from the group consisting of polyethylene glycol, polyvinylpyrrolidone, oligomers of polypropylene glycol, water soluble natural gums, and mixtures thereof; said binder for said first and second solution is selected from the group consisting of gum arabic, xanthan gum, gum tragacanth, tapioca dextrin, and modified food starch, and mixtures thereof; and said moisture absorbent is selected form the group consisting of mannitol, dicalcium phosphate, talc, magnesium stearate, calcium phosphate, calcium sulfate, silicas, and mixtures thereof.

8. The process of claim 1 wherein said film-forming agent of said first and second solution is hydroxypropyl cellulose and methyl cellulose and said crystallization retardant of said first and second solution is titanium dioxide and calcium carbonate.

9. The process of claim 1 wherein said edible core is selected from the group consisting of chewing gum, candy, and a pill or tablet for medicinal or therapeutic purposes.

10. A process for producing a sorbitol coated comestible which comprises applying to a substantially anhydrous edible core at least two coating solutions comprising sorbitol to coat the edible core,
wherein the first coating solution comprises:
(a) about 77 to about 81 wt % sorbitol solution comprising about 65 to about 75 wt % sorbitol;
(b) about 9.5 to about 12.5 wt % crystalline sorbitol powder;
(c) about 0.25 to about 1.5 wt % of at least one film-forming agent selected from the group consisting of hydroxypropyl cellulose, hydroxypropyl methyl cellulose, methyl cellulose, ethyl cellulose, hydroxyethyl cellulose, gelatin, and mixtures thereof;
(d) about 0.1 to about 5.0 wt % of at least one crystallization retardant selected from the group consisting of calcium carbonate, talc, magnesium trisilicate, titantium dioxide and mixtures thereof; and
(e) optionally, about 0.05 to about 0.2 wt % of at least one binder selected from the group consisting of gum arabic, xanthan gum, gum tragacanth, tapioca dextrin, modified food starch, and mixtures thereof; and
wherein the second coating solution comprises:
(a) about 82 to about 92 wt % sorbitol solution comprising about 65 to about 92 wt % sorbitol;
(b) about 1.0 to about 2.5 wt % crystalline sorbitol powder;
(c) about 0.05 to about 2.0 wt % of at least one film-forming agent selected from the group consisting of hydroxypropyl cellulose, hydroxypropyl methyl cellulose, methyl cellulose, ethyl cellulose, hydroxyethyl cellulose, gelatin, and mixtures thereof;
(d) about 0.1 to about 0.3 wt % of at least one crystallization retardant selected from the group consisting of calcium carbonate, talc, magnesium trisilicate, titanium dioxide, and mixtures thereof; and
(e) optionally, about 0.05 to about 0.3 wt % of at least one binder selected from the group consisting of gum arabic, xanthan gum, gum tragacanth, tapioca dextrin, modified food starch, and mixtures thereof; and
applying, after the application of said first and second coating solution, a coating solution comprising about 20 to about 30 wt % binder selected from the group consisting of gum arabic, xanthan gum, gum tragacanth, tapioca dextrin, modified food starch, and mixtures thereof; and
after application of each coating solution, drying said solution to prepare a final product which is a smooth, hard, and crunchy comestible.

11. The process of claim, 10 wherein an additional step is added in which a sealing coating is applied to said coated comestible after the coating solution comprising binder has been applied.

12. The process of claim 11 wherein said sealing coating comprises a sealant selected from the group consisting of a blend of natural and artificial food grade waxes, candelilla wax, paraffin wax and shellac.

13. The process of claim 10 wherein an additional step is added in which the application of each of said first coating solution, second coating solution, and coating solution comprising binder is repeated.

14. The process of claim 10 wherein said first solution additionally contains a plasticizer in an amount of about 0.2 to about 0.5 wt %, and said second solution additionally contains a plasticizer in an amount of about 0.4 to about 1.0 wt %, said plasticizer for said first and second solutions being selected from the group consisting of polyethylene glycol, polyvinylpyrrolidone, oligomers of polypropylene glycol, water soluble natural gums, and mixtures thereof.

15. The process of claim 10 wherein said film-forming agent is a mixture of hydroxypropyl cellulose and methyl cellulose and said crystallization retardant is a mixture of titanium dioxide and calcium carbonate.

16. The process of claim 10 wherein said binder is gum arabic.

17. The process of claim 12 wherein an additional step is added in which the application of the coating solutions is repeated; and wherein the first solution additionally contains a plasticizer in an amount of about 0.2 to about 0.5 wt % and second solution additionally contains a plasticizer in an amount of about 0.4 to about 1.0 wt %, said plasticizer for said first and second solutions being selected from the group consisting of polyethylene glycol, polyvinylpyrrolidone, oligomers of polypropylene glycol, water soluble natural gums, and mixtures thereof; and wherein said first solution optionally contains from about 0.5 to about 3.0 wt % of a moisture absorbent selected from the group consisting of mannitol, dicalcium phosphate, talc, magnesium stearate, calcium phosphate, calcium sulfate, silicas, and mixtures thereof.

18. The process of claim 17 wherein said plasticizer is polyethylene glycol, the film-forming agent is a mixture of hydroxypropyl cellulose and methyl cellulose, the crystallization retardant is a mixture of titanium dioxide and calcium carbonate, the binder is gum arabic, and said moisture absorbent is mannitol.

19. The sorbitol coated comestible of the process of claim 1.

20. The sorbitol coated comestible of the process of claim 10.

21. The sorbitol coated comestible of the process of claim 11.

22. The sorbitol coated comestible of the process of claim 17.

* * * * *